United States Patent [19]

Irie et al.

[11] 4,282,333

[45] Aug. 4, 1981

[54] POLYOLEFIN SERIES RESIN COMPOSITION FOR WATER-TREE RETARDANT ELECTRIC INSULATION

[75] Inventors: Shin-ichi Irie, Ichihara; Kenji Uesugi, Chiba-Ken, Hitoshi Kimura, Ichihara, all of Japan

[73] Assignee: The Furukawa Electric Co., Ltd., Tokyo, Japan

[21] Appl. No.: 114,570

[22] Filed: Jan. 23, 1980

[30] Foreign Application Priority Data

Jan. 29, 1979 [JP] Japan .................................. 54/8896

[51] Int. Cl.[3] ........................ C08K 5/29; B32B 27/18

[52] U.S. Cl. ........................................ 525/6; 428/379; 525/123; 525/124; 525/125; 525/132; 525/133; 525/374; 525/387

[58] Field of Search .................. 525/6, 123, 124, 125, 525/132, 133, 374, 387; 428/379; 260/45.95 C, 45.95 E, 45.95 F, 45.95 H

[56] References Cited

U.S. PATENT DOCUMENTS

| | | | |
|---|---|---|---|
| 2,982,754 | 5/1961 | Sheffer et al. | 428/379n4 |
| 3,069,379 | 12/1962 | Lavin et al. | 428/379 |
| 3,796,775 | 3/1974 | Glaser et al. | 525/6 |
| 3,808,047 | 4/1974 | McAda | 428/379 |
| 3,819,410 | 6/1974 | Kuckyo et al. | 428/379 |
| 4,060,659 | 11/1977 | Matsubara et al. | 428/379 |

*Primary Examiner*—John Kight, III
*Attorney, Agent, or Firm*—Frishauf, Holtz, Goodman & Woodward

[57] ABSTRACT

A polyolefin series resin composition for water-tree retardant electric insulation which comprises a polyolefin series resin and an organic isocyanate compound having at least one isocyanate radical in the molecule, or said polyolefin series resin, said organic isocyanate compound and an organic peroxide.

13 Claims, 1 Drawing Figure

POLYOLEFIN SERIES RESIN COMPOSITION FOR WATER-TREE RETARDANT ELECTRIC INSULATION

Figure 1:
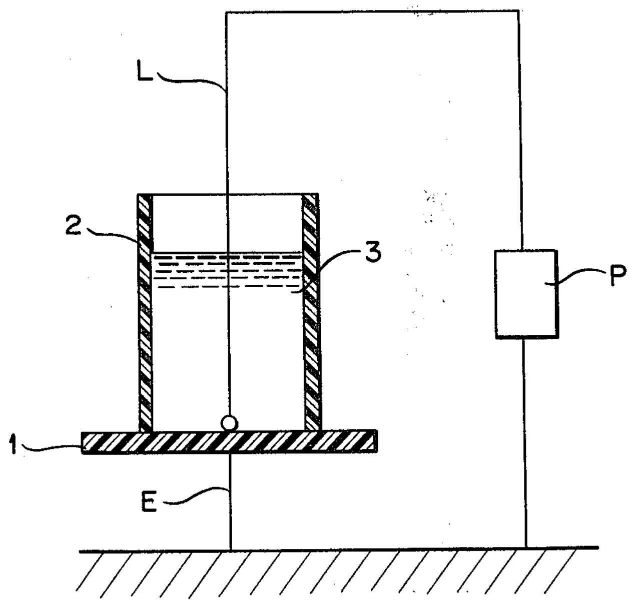

This invention relates to improvements on electric insulation polyolefin series resin composition and is intended to provide a resin composition particularly capable of substantially suppressing the interior growth of water trees.

Polyolefins and those cross-linked by a cross-linking agent such as an organic peroxide have excellent electric properties and are widely accepted as an electric insulation material for power cables. Where polyolefin is used as an insulation material for a power cable, an electric insulation layer is formed by extruding the polyolefin over a conductor of the power cable directly or with a conductor shield in between or extruding a polyolefin resin containing a cross-linking agent on the peripheral surface of the cable conductor or the conductor shield, and cross-linking said polyolefin resin. A polyolefin insulated cable thus manufactured is much easier in maintenance and inspection than oil filled cable because it dispenses with such extra equipment as oil tank, and troublesome sampling test of insulation oil. Therefore, a polyolefin electric insulation is widely in use for power cables of up to 154 KV.

Though having the above-mentioned advantages, the polyolefin or cross-linked polyolefin insulated power cable sometimes develops dielectric breakdown, after some years of use. This has been found due to the growth of water-tree in the polyolefin insulation induced by water which penetrates into it in case the cable laid in a manhole is immersed in water. As used herein, the term "water-tree" means a dendritic formation of water contained in the polyolefin insulation layer. When water and an electric field are present in the polyolefin insulation layer, the phenomenon of water-tree has been found to emerge at irregular portions of said polyolefin insulation layer where electric field tends to concentrate, for example, around protrusions on the inner semiconductive layer or voids or contaminants formed in the insulation layer. Sometimes by way of distinction, water-tree originated from the irregularities (for example, protrusions) of the internal semiconductive layer are referred to as "Water-tree from conductor shield" and those from contaminants or voids in the polyolefin insulation layer are called "bow-tie tree". Once generated in the polyolefin insulation layer water-tree continue to grow by the action of an electric field and finally penetrate the wall of the polyolefin insulation layer, resulting in the breakdown thereof. The growth of such water-tree noticeably impairs the properties of a power cable.

This invention has been accomplished in view of the above-mentioned difficulties. The present inventors have closely studied the method of effectively suppressing the growth of water-tree in an electric insulation layer prepared from polyolefin series resin. As a result, it has been found that a polyolefin series resin modified by the addition of an isocyanate compound can noticeably suppress the internal growth of water-tree even when used long as an insulation layer of power cables.

FIG. 1 is a schematic sectional illustration of the arrangement of an apparatus for applying an electric energy for determining the water-tree retardant property of samples used in the examples of this invention and controls.

Polyolefin series resin composition for water-tree retardant electric insulation embodying this invention is characterized by addition of an organic isocyanate compound to a polyolefin series resin. The mechanism of how the organic isocyanate added to the electric insulation polyolefin series resin substantially suppresses the growth of water-tree in said resin over a long period of time has not yet been clearly determined. However, the main reason for the substantial suppression of water-tree appears to be that an isocyanate radical present in the electric insulation polyolefin series resin layer absorbs water which penetrates into said electric insulation layer from the outside and is mainly responsible for the growth of water-tree and, through a reaction expressed by the following formula, is changed into a compound having an urea bond which makes a strong hydrogen bond that effectively traps incoming water.

$$2RNCO + H_2O \rightarrow RNHCONHR + CO_2$$

Any organic isocyanate compound is effective, provided its molecule contains at least one NCO radical. Concrete organic isocyanate compounds include phenyl isocyanate; ethyl isocyanate; 2,4-tolylene diisocyanate; 2,6-tolylene diisocyanate; 3,3-bitolylene-4,4-diisocyanate; 4,4'-diphenylmethane diisocyanate; 4,2'-diphenylmethane diisocyanate; 3,3'-dimethyldiphenylemethane-4,4'-diisocyanate; ethane diisocyanate; propane diisocyanate; butane diisocyanate; thiodiethyl diisocyanate; thioddipropyl diisocyanate; ω, ω'-diisocyanate-1,3-dimethyl benzene; ω, ω'-diisocyanate-1,4-dimethyl benzene; ω, ω'-diisocyanate-1,2-dimethyl cyclohexane; ω,ω'-diisocyanate-1,4-dimethyl naphthalene; 1,3-diphenylene diisocyanate; naphthalene diisocyanate; 1,3,5-trimethyl benzene-2,4,6-triisocyanate; triphenylmethane-4,4',4''-triisocyanate; the above listed isocyate compounds stabilized by, for example, phenol; and dimers and trimers manufactured by Farbenfabriken Bayer A.G. of Germany under the tradenames "Desmodur-AP-Stable" and "Desmodur-CT-Stable". Further, it is also possible to use polymer isocyanates which are obtained by converting a reaction product of aniline and formaldehyde by phosgene and expressed by the following general formula:

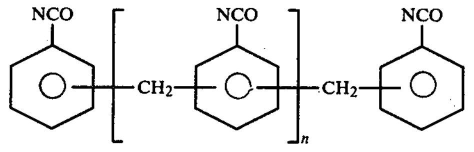

where:

n = an integer of 0 to 10

Organic polyisocyanates expressed by the general formula R-(NCO)n (where R is an aromatic or aliphatic residue, and n is an integer of 2 to 4) are preferred for practical application because they are blended with an electric insulation polyolefin series resin only in a small quantity, are readily available, and cost low.

An organic isocyanate compound added in an amount of less than 0.1 part by weight to 100 parts by weight of polyolefin series resin has a low practical effect of suppressing the growth of water-trees. Conversely, when an organic isocyanate compound is added in an amount of more than 10 parts by weight, the effect of suppressing the growth of water trees becomes saturated, resulting in economic disadvantages. Therefore, the organic isocyanate compound should be blended with the electric insulation polyolefin series resin in an amount ranging preferably from 0.1 to 10.0 parts by weight as against 100 parts by weight of said resin.

The polyolefin series resins used as the main component of a composition embodying this invention are herein defined to means, for example, high-, medium- and low-density polyethylene, polypropylene, chlorinated polyethylene, ethylene-vinylacetate copolymer, ethylene-ethyl acrylate copolymer and ethylene-propylene copolymer.

It is possible to add an organic peroxide as cross-linking agent to the electric insulation polyolefin series resin composition embodying this invention in order to elevate its heat resistance. An organic peroxide added in an amount of less than 0.5 part by weight to 100 parts by weight of the polyolefin series resin fails to display a sufficient cross-linking effect on said electric insulation polyolefin series resin. Conversely, when the organic peroxide is added in an amount of more than 5.0 parts by weight, then the extruder screw tends to slip, making it difficult to extruding an electric insulation polyolefin series resin layer. Therefore, the organic peroxide should be added in an amount ranging preferably from 0.5 to 5.0 parts by weight.

The organic peroxides used for cross-linking include di-t-butyl peroxide; t-butyl cumyl peroxide; dicumyl peroxide; 2,5-dimethyl-2,5-di(t-butyl peroxy) hexane; 2,5-dimethyl-2,5-di(t-peroxy) hexane-3; and 1,3-bis-(t-butyl peroxyisopropyl) benzene. These peroxides are preferred for practical application, because they have a higher decomposition temperature than that at which the polyolefin series resin is molded.

A polyolefin series resin composition embodying this invention may further contain one or two high temperature antioxidants. Preferred high temperature oxidants include steric hindrance type phenols such as 1,3,5-trimethyl-2,4,6-tris-(3,5-di-t-butyl-4-hydroxybenzyl) benzene; 1,3,5-tris-(3,5-di-t-butyl-4-hydroxybenzyl)-5-triazine-2,4,6-(1H, 3H, 5H) trione; tetrakis-[methylene-3-(3′,5-di-t-butyl-4′-hydroxyphenyl) propionate] methane; di-(2-methyl-4-hydroxy-5-t-butylphenyl) Sulfide; and polymerized 2,2,4-trimethyl dihydroxyquinoline.

A polyolefin series resin composition for water-tree retardant electric insulation embodying this invention is prominently adapted for use for insulated electric wires, cables, electric appliances applied in a humid atmosphere.

This invention will be more fully understood by reference to the examples and controls which follow.

Examples 1 to 4 and Controls 1 and 2

To determine the water-tree suppressing property, various polyolefin series resin compositions listed in Table 1 below (the amount of each component is given in parts by weight) were first roll-kneaded and then pressed for 10 minutes at 120° C. for non-cross-linked compositions and for 30 minutes at 160° C. for cross-linked compositions to form sheets having a thickness of 0.5 mm. Each sample sheet was given electric energy for 48 hours at 2 KV and 1 KHz by the method shown in FIG. 1, in which it was kept in contact with water.

Observation was made of the internal condition of the sample sheets given electric energy by a 100-power microscope to determine the growth of water-trees therein. Referring to FIG. 1, a reference numeral 1 denotes a sample; 2 a pipe of polyvinyl chloride; 3 water in said polyvinyl chloride pipe; P a high voltage power source; L a lead wire; and E an earth wire. The results of the electric energy application test are set forth in Table 1 below.

TABLE 1

| | Examples | | Control | Examples | | Control |
|---|---|---|---|---|---|---|
| | 1 | 2 | 1 | 3 | 4 | 2 |
| Polyethylene* | 100 | 100 | 100 | 100 | 100 | 100 |
| Ethyl isocyate | 0.5 | — | — | — | 3.0 | — |
| 4,4′-diphenyl-methane diisocyanate | — | 1.0 | — | 0.5 | — | — |
| Dicumyl peroxide | — | — | — | 2.5 | 2.5 | 2.5 |
| Di(2-methyl-4-hydroxy-5-t-butylphenol) sulfide | 0.2 | 0.2 | 0.2 | 0.2 | 0.2 | 0.2 |
| Number of bow-tie trees grown per mm³ | 0.5 | 0.05 | 20 | $1 \times 10^{-2}$ | $5 \times 10^{-2}$ | 10 |

*Having a melt index of 3.0 and a density of 0.920

Examples 5 to 10 and Controls 3 and 4

Sample sheets were prepared from the compositions listed in Table 2 below (the amount of each component is given in parts by weight) in the same manner as in Example 1. The sample sheets were tested by the same method as applied in Example 1, the results being shown in Table 2 below.

TABLE 2

| | Examples | | | | | | Controls | |
|---|---|---|---|---|---|---|---|---|
| | 5 | 6 | 7 | 8 | 9 | 10 | 3 | 4 |
| Polyethylene*1 | — | — | — | 70 | 70 | 70 | — | 70 |
| Ethylene-propylene Copolymer*2 | 100 | 100 | 100 | — | — | — | 100 | — |
| Ethylene-ethylacrylate copolymer*3 | — | — | — | 30 | 30 | 30 | — | 30 |
| Phenyl isocyanate | 0.5 | — | — | 1.0 | — | — | — | — |
| Ethyl isocyanate | — | 1.0 | — | — | 3.0 | — | — | — |
| 4,4′-diphenylmethane diisocyanate | — | — | 3.0 | — | — | 5.0 | — | — |
| Dicumyl peroxide | 2.5 | 2.5 | 2.5 | — | — | — | 2.5 | — |
| Di-(2-methyl-4-hydroxy-5-t-butylphenyl) sulfide | 0.2 | 0.2 | 0.2 | 0.2 | 0.2 | 0.2 | 0.2 | 0.2 |
| Number of bow-tie | 0.3 | 0.3 | $1 \times 10^{-2}$ | 0.1 | 0.1 | $1 \times 10^{-3}$ | 50 | 35 |

TABLE 2-continued

| | Examples | | | | | | Controls | |
|---|---|---|---|---|---|---|---|---|
| | 5 | 6 | 7 | 8 | 9 | 10 | 3 | 4 |
| trees grown per mm$^3$ | | | | | | | | |

*1 Having a melt index of 3.0 and a density of 0.920
*2 Propylene content 26%; iodine value 19; and Mooney viscosity 40
*3 Having a melt index of 6 and a density of 0.931

Examples 11 to 13 and Control 5

A 6KV cable insulated with cross-linked polyethylene was manufactured by extruding in a thickness of 1 mm a semiconductive compound whose base polymer was formed of an ethylene-vinyl acetate copolymer on the peripheral surface of a stranded conductor having a cross sectional area of 22 mm$^2$, extruding polyethylene compositions prepared from the compounds listed in Table 3 below (the amount of each component is given in parts by weight) on the peripheral surface of said semiconductive compound in a thickness of 3 mm and finally cross-linking the polyethylene compounds by an apparatus of catenary continuous vulcanization. Cross-linking was carried out at a pressure of 17 kg/cm$^2$. The 6 KV cable thus manufactured was dipped in hot water at 80° C. and applied with electric energy for 15 months at 50 Hz and 15 KV. After the cable was taken out, the number of water-trees grown in the electric insulation layer of said cable was determined. The results of the test are set forth in Table 3 below together with the AC breakdown characteristic of the electric insulation layer before and after the electric energy application in water.

TABLE 3

| | | Examples | | | Control |
|---|---|---|---|---|---|
| | | 11 | 12 | 13 | 5 |
| Polyethylene* | | 100 | 100 | 100 | 100 |
| Dicumyl peroxide | | 2.0 | 2.0 | 2.0 | 2.0 |
| 4,2'-diphenylmethane diisocyanate | | 0.1 | 5.0 | 0.05 | 0 |
| Di-(2-methyl-4-hydroxy-5-butylphenyl) sulfide | | 0.3 | 0.3 | 0.3 | 0.3 |
| A number of water-trees grown per mm$^3$ | | $1 \times 10^{-3}$ | $1 \times 10^{-4}$ | 2 | 20 |
| AC breakdown Voltage (KV/mm) | Before electric energy application in water | 120 | 120 | 120 | 120 |
| | After electric energy application in water | 110 | 110 | 100 | 70 |

*Having a melt index of 3.0 and a density of 0.920

Examples 14 to 16 and Control 6

A model polyethylene-insulated cable was manufactured by extruding in a thickness of 4 mm polyethylene compositions prepared from components listed in Table 4 below (the amount of each component is given in parts by weight) on the peripheral surface of a conductor having a cross sectional area of 22 mm$^2$. The model cable thus manufactured was dipped in hot water of 80° C., and given electric energy at 50 Hz and 15 KV for 15 months. After the cable was taken out, the number of water-trees grown in the insulation layer of the cable was determined. The results of the test are indicated in Table 4 below, together with the AC breakdown characteristic before and after electric energy application in water.

TABLE 4

| | | Examples | | | Control |
|---|---|---|---|---|---|
| | | 14 | 15 | 16 | 6 |
| Polyethylene* | | 100 | 100 | 100 | 100 |
| 4,4'-diphenylmethane diisocyanate | | 0.1 | 5.0 | 0.05 | 0 |
| Di(2-methyl-4-hydroxy-5-butylphenyl) sulfide | | 0.2 | 0.2 | 0.2 | 0.2 |
| A number of water-trees grown per mm$^3$ | | $1 \times 10^{-2}$ | $1 \times 10^{-3}$ | 5 | 32 |
| AC breakdown Voltage (KV/mm) | Before electric energy application in water | 110 | 110 | 110 | 110 |
| | After electric energy application in water | 100 | 100 | 80 | 60 |

*Having a melt index of 3.0 and a density of 0.920

Examples 17 to 19 and Control 7

A 6 KV power cable insulated with an ethylene-propylene copolymer was manufactured by extruding in a thickness of 1.0 mm a semiconductive compound whose base polymer was formed of an ethylene-vinyl acetate copolymer on the peripheral surface of a stranded conductor having a cross sectional area of 22 mm$^2$, extruding ethylene-propylene copolymer compositions prepared from the components listed in Table 5 below (the amount of each component is given in parts by weight) on the peripheral surface of said semiconductive compound and cross-linking the electric insulation ethylene-propylene copolymer by the apparatus of catenary continuous vulcanization. The 6 KV power cable thus manufactured was dipped in hot water of 80° C., and given electric energy for 15 months at 50 Hz and 15 KV. After the cable was taken out, the number of water-trees was determined. The results of the test are set forth in Table 5 below together with the AC breakdown characteristic before and after electric energy application in water.

TABLE 5

| | | Examples | | | Control |
|---|---|---|---|---|---|
| | | 17 | 18 | 19 | 7 |
| Ethylene-propylene copolymer*1 | | 100 | 100 | 100 | 100 |
| 4,4'-diphenylmethane diisocyanate | | 0.1 | 5.0 | 0.05 | 0 |
| di-(2-methyl-4-hydroxy-5-butylphenyl) sulfide | | 0.2 | 0.2 | 0.2 | 0.2 |
| Dicumyl peroxide | | 3.0 | 3.0 | 3.0 | 3.0 |
| Silicon oxide*2 | | 10 | 10 | 10 | 10 |
| A number of water-trees grown per mm$^3$ | | $2 \times 10^{-1}$ | $4 \times 10^{-2}$ | 8.0 | 25 |
| AC breakdown Voltage (KV/mm) | Before electric energy application in water | 100 | 100 | 100 | 100 |
| | After electric energy applica- | 90 | 90 | 80 | 70 |

TABLE 5-continued

| | Examples 17 | 18 | 19 | Control 7 |
|---|---|---|---|---|
| tion in water | | | | |

*[1]Propylene content 26%; iodine value 19; Mooney viscosity 40
*[2]Manufactured by Tokuyama Soda Co., under the tradename "Tokusil"

Examples 20 to 22 and Control 8

A 6 KV power cable was manufactured by extruding in a thickness of 1.0 mm a semiconductive compound whose base polymer was formed of an ethylene-vinyl acetate copolymer on the peripheral surface of a stranded conductor having a cross sectional area of 22 $mm^2$, extruding in a thickness of 3 mm a blend resin compositions comprising an ethylene-ethyl acrylate copolymer and polyethylene which was prepared from the components listed in Table 6 below (the amount of each component is given in parts by weight) as an electric insulation layer on the peripheral surface of said semiconductive compound, and cross-linking said electric insulation layer thus formed in the same manner as in Example 11. The power cable thus manufactured was dipped in hot water of 80° C. and given electric energy for 15 months at 50 Hz and 15 KV. After the cable was taken out, the number of water-trees grown in the electric insulation layer of said cable was determined. The results of the test are set forth in Table 6 below together with the A.C. breakdown characteristic of the electric insulation layer before and after the electric energy application in water.

TABLE 6

| | | Examples 20 | 21 | 22 | Control 8 |
|---|---|---|---|---|---|
| Polyethylene*[1] | | 70 | 70 | 70 | 70 |
| Ethylene-ethyl acrylate copolymer*[2] | | 30 | 30 | 30 | 30 |
| 4,4'-diphenylmethane diisocyanate | | 0.1 | 5.0 | 0.05 | 0 |
| di-(2-methyl-4-hydroxy-5-butylphenyl) sulfide | | 0.2 | 0.2 | 0.2 | 0.2 |
| Dicumyl peroxide | | 2.5 | 2.5 | 2.5 | 2.5 |
| A number of water-trees grown per $mm^2$ | | $1 \times 10^{-2}$ | $1 \times 10^{-3}$ | 5.0 | 25 |
| AC breakdown voltage (KV/mm) | Before electric energy application in water | 100 | 100 | 100 | 100 |
| | After electric energy application in water | 100 | 100 | 90 | 80 |

:[1]Having a melt index of 3.0 and a density of 0.920
*[2]Having a melt index of 6.0 and a density of 0.931

What is claimed is:

1. A polyolefin series resin composition for water-tree retardant electric insulation which comprises a polyolefin series resin and an organic isocyanate compound having at least one isocyanate radical in the molecule.

2. The polyolefin series resin composition for water-tree retardant electric insulation according to claim 1, which further comprises an organic peroxide.

3. The polyolefin series resin composition for water-tree retardant electric insulation according to claim 1 or 2, wherein the organic isocyanate compound is added in an amount of 0.1 to 10.0 parts by weight to 100 parts by weight of polyolefin series resin.

4. The polyolefin series resin composition for water-tree retardant electric insulation according to claim 2, wherein the organic peroxide is added in an amount of 0.5 to 5.0 parts by weight to 100 parts by weight of polyolefin series resin.

5. The polyolefin series resin composition for water-tree retardant electric insulation according to claim 1, wherein the polyolefin series resin is one selected from the group consisting of polyethylene in the broad sense, chlorinated polyethylene, ethylene-vinyl acetate copolymer and ethylene-propylene copolymer and a mixture of at least two resins selected from said group.

6. The polyolefin series resin composition for water-tree retardant electric insulation according to claim 1, wherein the polyolefin series resin is one selected from the group consisting of high density polyethylene, medium density polyethylene and low density polyethylene.

7. The polyolefin series resin composition for water-tree retardant electric insulation according to any one of claims 1, 2, 4, 5 or 6 wherein the organic isocyanate compound is an organic polyisocyanate compound expressed by the general formula:

$$R—(NCO)n$$

where:
R=an aromatic or aliphatic residue
n=an integer of 2 to 4.

8. The polyolefin series resin composition for water-tree retardant electric insulation according to claim 2, wherein the organic peroxide is one selected from the group consisting of di-t-butyl peroxide; t-butyl cumylperoxide; dicumyl perioxide; 2,5-dimethyl-2,5-di-(t-butylperoxy) hexane; 2,5-dimethyl-2,5-di-(t-peroxy) hexane-3; and 1,3-bis-(t-butylperoxyisopropyl) benzene.

9. The polyolefin series resin composition for water-tree retardant electric insulation according to claim 1 or 2, which further comprises a high temperature antioxidant.

10. The polyolefin series resin composition for water-tree retardant electric insulation according to claim 9, wherein the high temperature antioxidant is a steric hindered type phenol compound.

11. The polyolefin series resin composition for water-tree retardant electric insulation according to any one of claims 4, 5, 6 or 8, wherein the organic isocyanate compound is added in an amount of 0.1 to 10.0 parts by weight to 100 parts by weight of polyolefin series resin.

12. The polyolefin series resin composition for water-tree retardant electric insulation according to claim 7, wherein the organic isocyanate compound is added in an amount of 0.1 to 10.0 parts by weight to 100 parts by weight of polyolefin series resin.

13. The polyolefin series resin composition for water-tree retardant electric insulation according to claim 9, wherein the organic isocyanate compound is added in an amount of 0.1 to 10.0 parts by weight to 100 parts by weight of polyolefin series resin.

* * * * *

UNITED STATES PATENT AND TRADEMARK OFFICE
CERTIFICATE OF CORRECTION

PATENT NO. : 4,282,333

DATED : August 4, 1981

INVENTOR(S) : SHIN-ICHI IRIE et al

Figure 2:
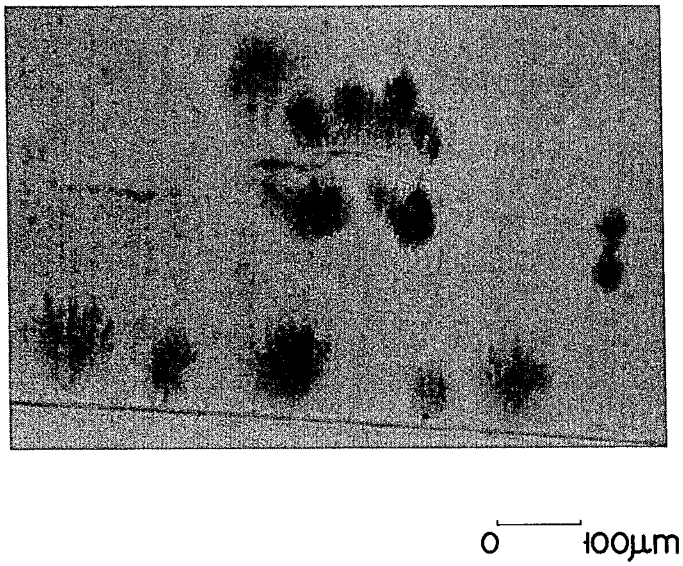

It is certified that error appears in the above—identified patent and that said Letters Patent is hereby corrected as shown below:

Cancel Fig. 2.

Signed and Sealed this

*Eighth* Day of *June 1982*

[SEAL]

*Attest:*

GERALD J. MOSSINGHOFF

*Attesting Officer*

*Commissioner of Patents and Trademarks*